July 9, 1935.  K. LANDGREBE  2,007,471

AUTOMOBILE TABLE ATTACHMENT

Filed Sept. 26, 1929  2 Sheets-Sheet 1

Inventor
Karl Landgrebe
By Johnston & Jennings
Attorneys

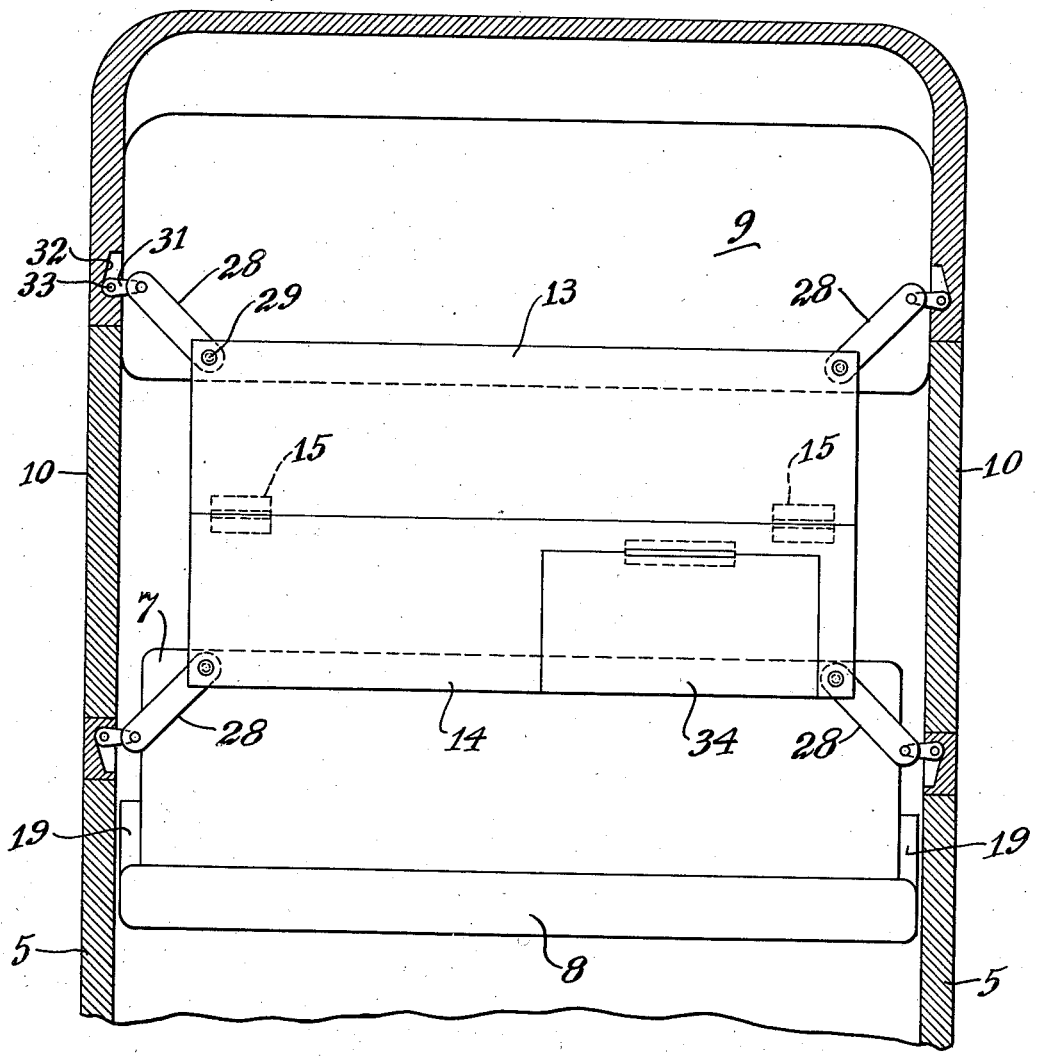

Patented July 9, 1935

2,007,471

UNITED STATES PATENT OFFICE 2,007,471

AUTOMOBILE TABLE ATTACHMENT

Karl Landgrebe, Ensley, Ala.

Application September 26, 1929, Serial No. 395,231

4 Claims. (Cl. 155—5)

My invention relates to a table attachment for automobiles, and my object is to enable automobile users to set up a table, which is normally concealed, in position so that it may be used to serve meals or to play cards on, thereby increasing the usefulness and comfort of automobiles to those using them for touring or pleasure purposes.

A further object of my invention is to adapt the back of the front seat to be shifted forward against the steering wheel and the seat itself to be shifted sufficiently to the rear to form a comfortable seat for those at the front of the table.

A further object of my invention is to provide in the back of the front seat a recess to receive the folded table, when not in use, this recess being preferably shallow and padded at the rear and covered by a flexible curtain or cover so that it will offer a comfortable back rest for those seated on the rearwardly adjusted front seat.

My invention also contemplates the provision of an upwardly folding section or panel in the table so disposed that one may lift it and rise from the front seat and step out of the car between the forwardly adjusted back of the front seat and either the front or rear door. This will permit one of the occupants to get in and out without disturbing the table after it has been set up.

My invention also comprises the novel means by which the rearwardly adjustable front seat will carry with it legs or supports for its overhung rear end when it is shifted back for use at the table.

My invention also comprises means normally concealed to support the forward edge of the table from the back of the front seat which will be used when the table is to be used only by those seated on the back seat or while the car is being driven.

My invention also contemplates the provision of novel means that will prevent the front seat, when in use in its normal position, from being shifted to the rear but which will permit the seat to be readily manipulated so that it can be shifted to the rear for use at the table.

My invention also comprises novel means for adjustably mounting the back of the front seat so that it will take a bearing at each side, for both its forward and its rearward positions, against the floor of the car.

My invention also comprises the novel details of construction and arrangement of parts, which form a part of this specification, and in which:—

Fig. 4 is an enlarged horizontal cross-sectional view through the automobile, showing the table in plan mounted in operating position available for use by persons seated on both front and back seats.

Similar reference numerals refer to similar parts throughout the drawings.

Figure 1:
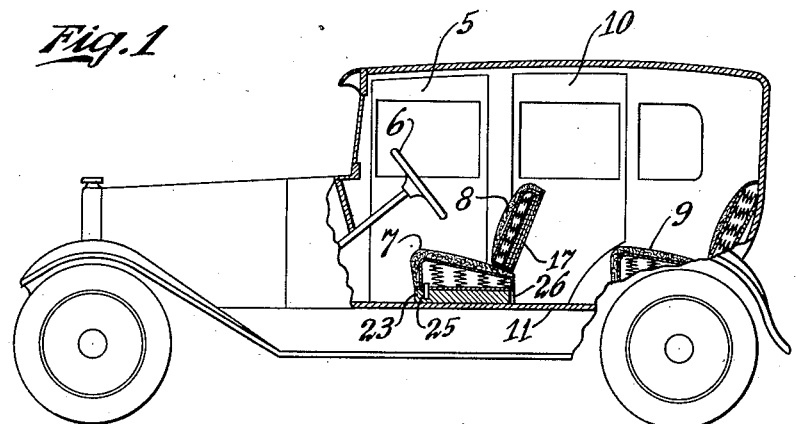
Fig. 1 is a side elevation of an automobile broken away to show the front seat and part of the car seat in vertical longitudinal cross section in normal operating position with the table folded and in concealed position in the compartment provided for it in the back of the front seat.

I have illustrated my invention as applied to a limousine having the typical front doors 5, a steering wheel 6, a front seat comprising the seat portion 7 and the continuous back portion 8, a rear seat 9, rear doors 10, and a floor 11.

Extending transversely across the back of the front seat portion 8 is a shallow recess or pocket 12 adapted to receive a folded table attachment which comprises the sections 13 and 14 connected by the hinges 15. The inner wall of the recess 12 is padded, as at 16, and the recess is covered by a leather or canvas flap 17 provided with suitable attaching buttons or clasps 18 at the bottom. The compartment 12 is shallow enough and the back cover is loose and flexible enough for the padding 16 to form a comfortable back cushion for one leaning against it when seated, as will be hereinafter described.

Figure 2:
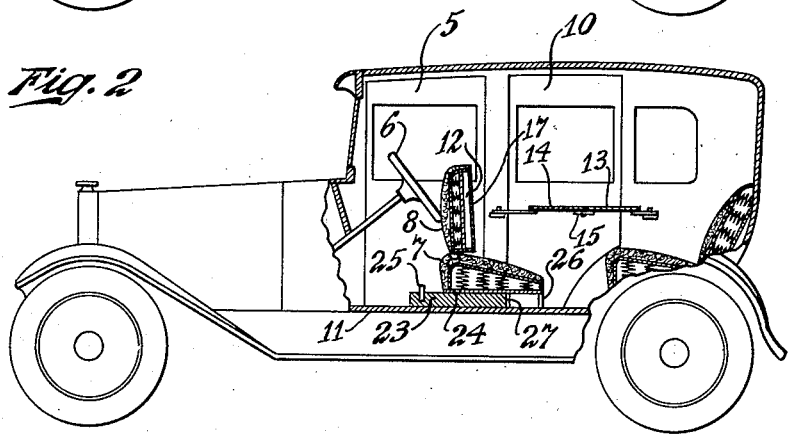
Fig. 2 is a corresponding view showing the back of the front seat adjusted forwardly and the seat itself adjusted rearwardly, with the table shown in cross section in position for use.

The end plates 19 at each end of the back 8 extend down on each side of the seat 7 and each is provided with a pair of pins 20 working in a slot 21 in a plate 22 mounted at each end of the support 23 for the seat portion 7. The slots and pins are arranged to permit the back to come to rest in a rearwardly adjusted position, as shown in Fig. 1, and in a forwardly adjusted position, as shown in Fig. 2, in which latter case it is stopped just as it would engage the steering wheel 6. The slots are inclined to permit the back to ride up over the front seat, if it be inclined upwardly and forwardly as is usual.

Figure 3:
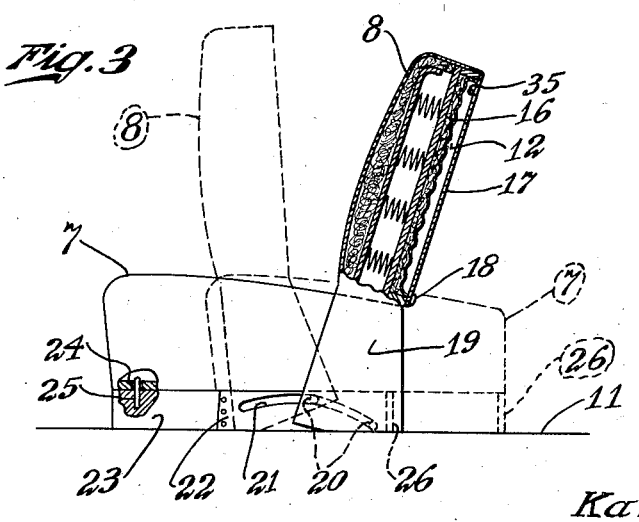
Fig. 3 is enlarged view showing the front seat elements and the adjustable connection for the back of the front seat in elevation, the back being broken away to show the padded recess of the table.

The bottom end of each side plate 19 is beveled from each side toward the center, thus providing a rear bearing face, adapted to rest on the floor 11 and brace the back of the seat when the seat is in its normal or full line position, Fig. 3, and a front bearing face adapted to rest on the floor when the seat occupies its forward or dotted position. I thus afford a firm bearing for the seat back at each end in both of its operating positions.

The seat 7 in its under side near the front is provided with a notch or slot 24 adapted to engage a pin 25 mounted near the front edge of the seat support 23. This pin when engaged in the notch will act as a stop means to prevent the seat 7 shifting rearwardly until its front edge is raised sufficiently to disengage it from the pin 25. The seat 7 at its back near each end carries legs or supports 26, which are normally received in counter-sunk recesses 27 in the seat support 23. These legs serve to support the rear overhung end of the seat 7 when it is adjusted to its rearward operating position, as shown in Fig. 2.

As shown in Fig. 4, the table is of less width than the car, which adapts it to be received in the available space for its recess 12. This necessitates the provision of extension arms 28, which are pivotally connected at 29 to the under-side of each corner of the table and each arm has at its free end a hole adapted to receive the upstanding pin 30 on a hinged bracket arm 31. These bracket arms are each mounted in a countersunk recess 32 in a fixed element of the side body and the brackets are adapted to swing on vertical pivots 33, which allows them to fold in flush when not in use.

The table section 14 is provided with a hinged section 34 adapted to swing upwardly from the horizontal level of the table and permit the occupant of the front seat opposite this section to rise without disturbing the table and step out of the car by opening the adjacent front door 5. Sufficient room is left between the door frame and the back 8 for a person to step out of the car.

When not in use, the table is detached from its brackets 31, the arms 28 are folded in under the table sections and the latter are folded upwardly together and the collapsed table is then ready to be inserted in recess 12, where it will remain concealed when not in use. The table hinges will only permit the table sections to open out into the same plane.

It will be apparent, by reference to Fig. 4, that when the table has been opened out and mounted in position it is available to serve persons seated comfortably on both front and back seats. In the position of parts shown in this figure, the back 8 has been adjusted forward and the seat 7 has been shifted rearward and is supported on 23 at the front and on its legs 26 at the rear.

It will be understood that my invention can be variously modified so as to adapt it to use in different automobiles without departing from its essential features.

Figure 5:
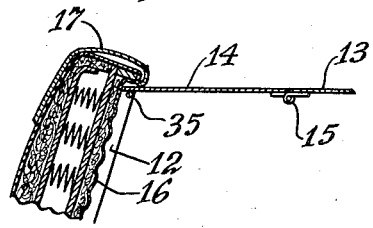
Fig. 5 illustrates the manner of supporting the forward edge of the table from the back of the front seat when in normal position.

Thus, I may provide rubber covered pins 35 fixed in the ends of the pocket 12 near the top thereof which will serve to support the front edge of the table when the back 8 is in normal position, as shown in Fig. 5. This will enable the table to be used only by occupants of the rear seat and will permit such use while the car is being driven. The curtain 17 can be readily pushed in behind these pins and they will be so spaced from the back of the pocket as to permit the upper edge of the folded table to be forced up behind them, thus serving to securely hold the table in the pocket against falling out and requiring that its bottom edge be pulled forward out of the pocket before it can be taken out.

What I claim is:

1. In an automobile, a front seat comprising a continuous seat portion having rear legs and a support upon which said seat portion is rearwardly adjustable from its normal forward operating position, in combination with means to lock said seat portion in its normal forward position, and a continuous adjustable back portion for said front seat adapted to be moved to a forward position with respect to said seat portion when the latter has been rearwardly adjusted, said back portion having side plates attached to the ends thereof carrying pins and said seat support having formed therein arcuate slots in which said pins are engaged and free to travel, the bottom end of each side plate being beveled to form front and rear bearing faces, respectively adapted to engage the floor of the automobile to brace the back portion in its forward or rearward position.

2. An automobile having means to mount a table between its front and rear seats, in combination with means to render the front seat available for use by persons seated at said table and facing rearwardly of the automobile, the said means comprising supports on which the seat element of the front seat is rearwardly slidable from its normal forward position, rear legs on said seat element to support its overhung end when rearwardly extended, means to lock the seat in its normal forward position, said front seat comprising a continuous back element, means to support said back element in its normal position comprising standards secured to the ends of said back element, guide elements rigidly mounted at each end of said seat, and means cooperatively inter-connecting said standards and guide elements whereby the back element may be shifted from its normal rear position forwardly and upwardly to a forward adjusted position overhanging the seat element and clear of the automobile steering wheel to serve as a back for rearwardly facing persons seated on the rearwardly adjusted front seat element and rigid means to stop said back element in its forward and rear operating positions respectively.

3. An automobile having the seat arrangement according to claim 2, in which the rearward face of the back element of the front seat is formed with a rearwardly opening recess substantially coextensive in length and height therewith and adapted to receive the table when not in use and to provide an increased back room for the rearwardly seated persons.

4. An automobile having the seat arrangement according to claim 2, in which the rearward face of the back element of the front seat is formed with a rearwardly opening recess substantially coextensive in length and height therewith and adapted to receive the table when not in use and to provide an increased back room for the rearwardly seated persons, said recess having its inner wall padded and having an outer flexible curtain cover, as and for the purposes described.

KARL LANDGREBE.